United States Patent [19]

Nafziger et al.

[11] Patent Number: 5,159,835

[45] Date of Patent: Nov. 3, 1992

[54] CHECK VALVE TESTING SYSTEM

[75] Inventors: Steven Nafziger, Chamblee; John A. McMennamy, Marietta, both of Ga.

[73] Assignee: Westinghouse Electric Corp., Pittsburgh, Pa.

[21] Appl. No.: 654,253

[22] Filed: Feb. 12, 1991

Related U.S. Application Data

[63] Continuation of Ser. No. 597,441, Oct. 15, 1990, abandoned, which is a continuation of Ser. No. 467,911, Jan. 22, 1990, Pat. No. 4,977,778, which is a continuation of Ser. No. 353,807, May 18, 1989, abandoned, which is a continuation of Ser. No. 924,837, Oct. 29, 1986, abandoned.

[51] Int. Cl.⁵ ............................................ G01N 29/00
[52] U.S. Cl. ........................................ 73/584; 137/554; 367/93
[58] Field of Search ............... 73/584, 592, 119 A, 73/168, 572, 597; 137/554; 340/870.28, 870.3; 367/93, 99; 376/245, 252

[56] References Cited

U.S. PATENT DOCUMENTS

| | | | |
|---|---|---|---|
| 4,452,074 | 6/1984 | Shelomentsev et al. | 73/119 A |
| 4,542,652 | 9/1985 | Reuter et al. | 73/597 |
| 4,543,649 | 9/1985 | Head et al. | 367/96 |
| 4,704,906 | 11/1987 | Churchill et al. | 73/597 X |

FOREIGN PATENT DOCUMENTS

| | | | |
|---|---|---|---|
| 2478255 | 9/1981 | France | 137/554 |
| 0089072 | 7/1981 | Japan | 367/99 |
| 57-40185 | 3/1982 | Japan . | |
| 0077679 | 5/1983 | Japan | 367/99 |
| 0046478 | 3/1985 | Japan | 367/99 |
| 0089783 | 5/1985 | Japan | 367/99 |
| 0236078 | 11/1985 | Japan | 367/99 |
| 0928948 | 6/1963 | United Kingdom | 73/572 |
| 1525720 | 9/1978 | United Kingdom | 367/99 |

*Primary Examiner*—Jerry W. Myracle

[57] ABSTRACT

A method and apparatus for testing the operating condition of a check valve directs sound waves into the valve chamber of a check valve assembly and utilizes the collected signals of the reflected sound waves to generate various time lapse data corresponding to the valve disk position and movement, such time lapse data providing an analysis of the condition of the valve assembly.

38 Claims, 2 Drawing Sheets

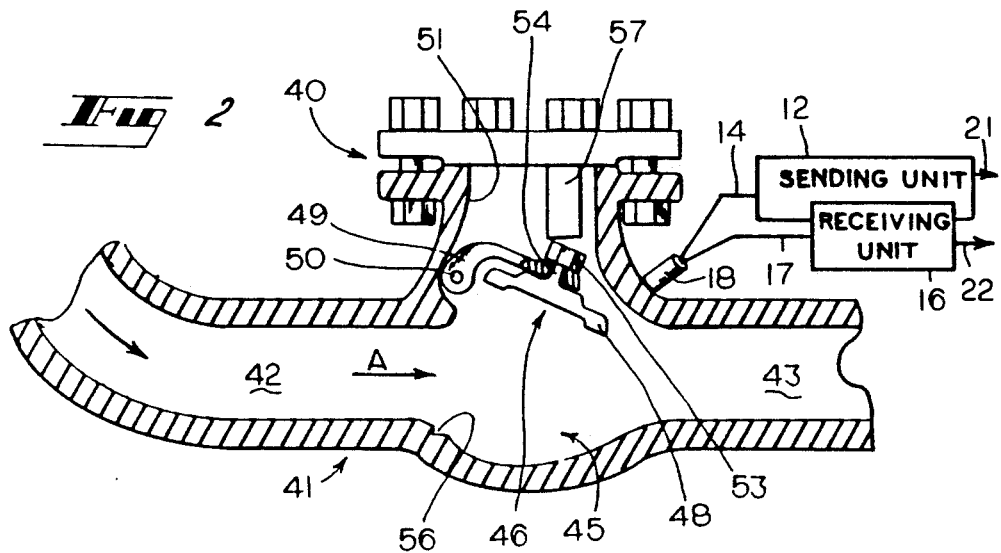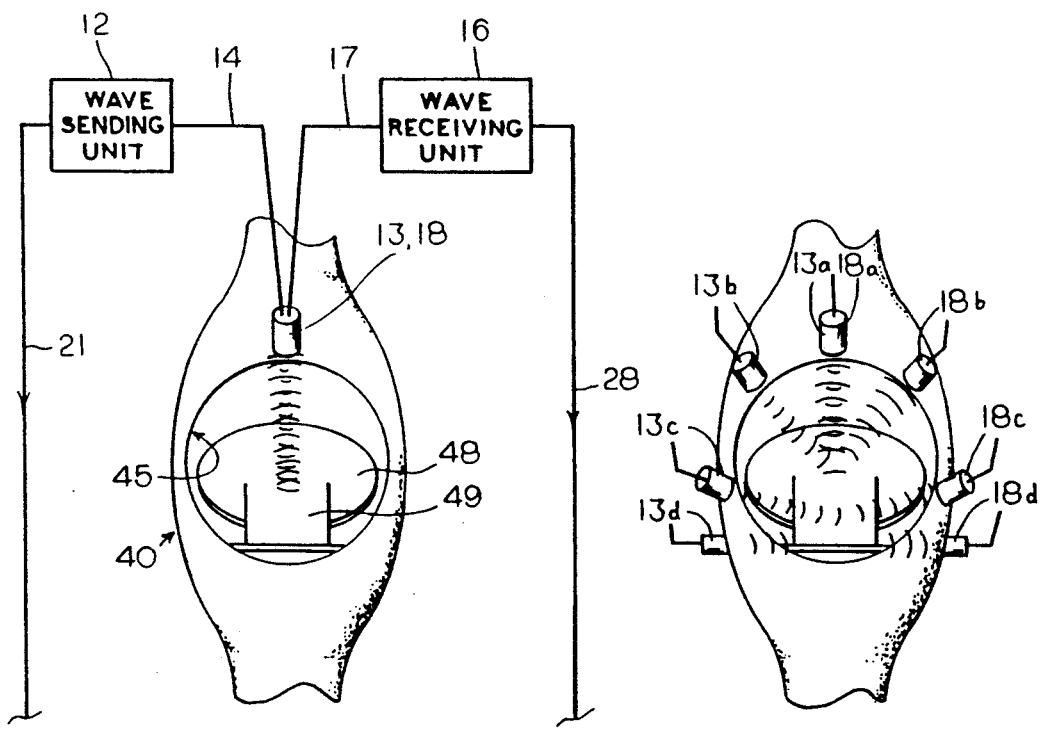

CHECK VALVE TESTING SYSTEM

This application is a continuation of application Ser. No. 07/597,441, filed Oct. 15, 1990, now abandoned, which is a continuation of Ser. No. 07/467,911, filed Jan. 22, 1990, now U.S. Pat. No. 4,977,778, which is a continuation of Ser. No. 07/353,807, filed May 18, 1989, now abandoned which is a continuation of Ser. No. 06/924,837, filed Oct. 29, 1986, now abandoned.

FIELD OF THE INVENTION

The present invention relates generally to the field of testing the condition of valves, and, most specifically to testing of check valves.

BACKGROUND OF INVENTION

A check valve is a type of one-way valve used in the control of fluid flow through conduits. The check valve permits the flow of fluid in a first direction through a conduit and prevents fluid flow in the reverse direction. A check valve is generally constructed with a disk which is mounted to a pivoting hinge. When fluid is flowing in the allowed direction, the fluid forces the disk to pivot upward to allow passage. When there is no fluid flow or when fluid attempts to flow in the reverse direction, the disk pivots (usually gravity drop) down to seal the conduit and prevent reverse flow. Typically, all of the parts of the check valve are located inside the valve chamber with no external parts available for visual inspection.

Since it is difficult, if not impossible, to achieve visual inspection of a check valve, the dangerous reality is that a user will generally not know if the check valve is actually working until the valve is needed; at which time, it may be too late. Under most operating conditions, the check valve stays normally open on a continuous basis because pumps are in constant operation and fluid is constantly being pumped through the conduit in the allowed flow direction. Thus, it can be seen that the disk or other parts of the check valve may be broken and simply lying in the conduit and no one will know of a problem; and, when the "check" function is required, the valve can not perform. Such unfortunate events are well documented in the industry. Furthermore, it is being more and more appreciated that undersized valves, oversized valves and certain turbulent conditions in the conduit can result in harmful, damaging vibration and "bouncing" of th check valve disk. There are not practical methods in the prior art to check for the existence of these harmful vibrations. To date, the present inventors are unaware of any systems available for testing the condition of a check valve without either tearing down the valve assembly or allowing reverse fluid flow.

BRIEF SUMMARY OF THE INVENTION

Briefly described, the present invention teaches a method and apparatus for testing the condition of a check valve which the valve is fully assembled and operating under various flow conditions, including no-flow. The present invention comprises the use of an ultrasonic sound transducer to send high frequency sound waves through the check valve casting and through the transported fluid to the valve disk. Reflection of the sound waves is detected and analyzed through the use of signal recording and conditioning devices to assist in determination of the positioning and movement of the valve disk.

It is an object of the present invention to provide a testing system to test and assist in analysis of the condition of check valve components without requiring physical inspection of the valve components nor requiring back flow of fluid.

Another object of the present invention is to provide a check valve testing method and apparatus for determining if a check valve is in an inoperative condition.

Still another object of the present invention is to provide a check valve testing method and apparatus for determining if a check valve is still operable yet being subjected to damaging operating conditions.

Other objects, features and advantages of the present invention will become apparent upon reading and understanding the following specification, when taken in conjunction with the accompanying drawings.

BRIEF DESCRIPTION OF THE DRAWINGS

FIG. 2 is a cut-a-way, side view of a check valve tested by the invention of FIG. 1, and depicting a portion of the check valve testing system of FIG. 1.

FIG. 3 is a schematic representation of a portion of the check valve testing system of FIG. 1, showing an alternate embodiment.

FIG. 4 is a representative view depicting various, alternate points of placement of the transducers of the check valve testing system of FIG. 1.

DETAILED DESCRIPTION OF THE PREFERRED EMBODIMENT

Figure 1:
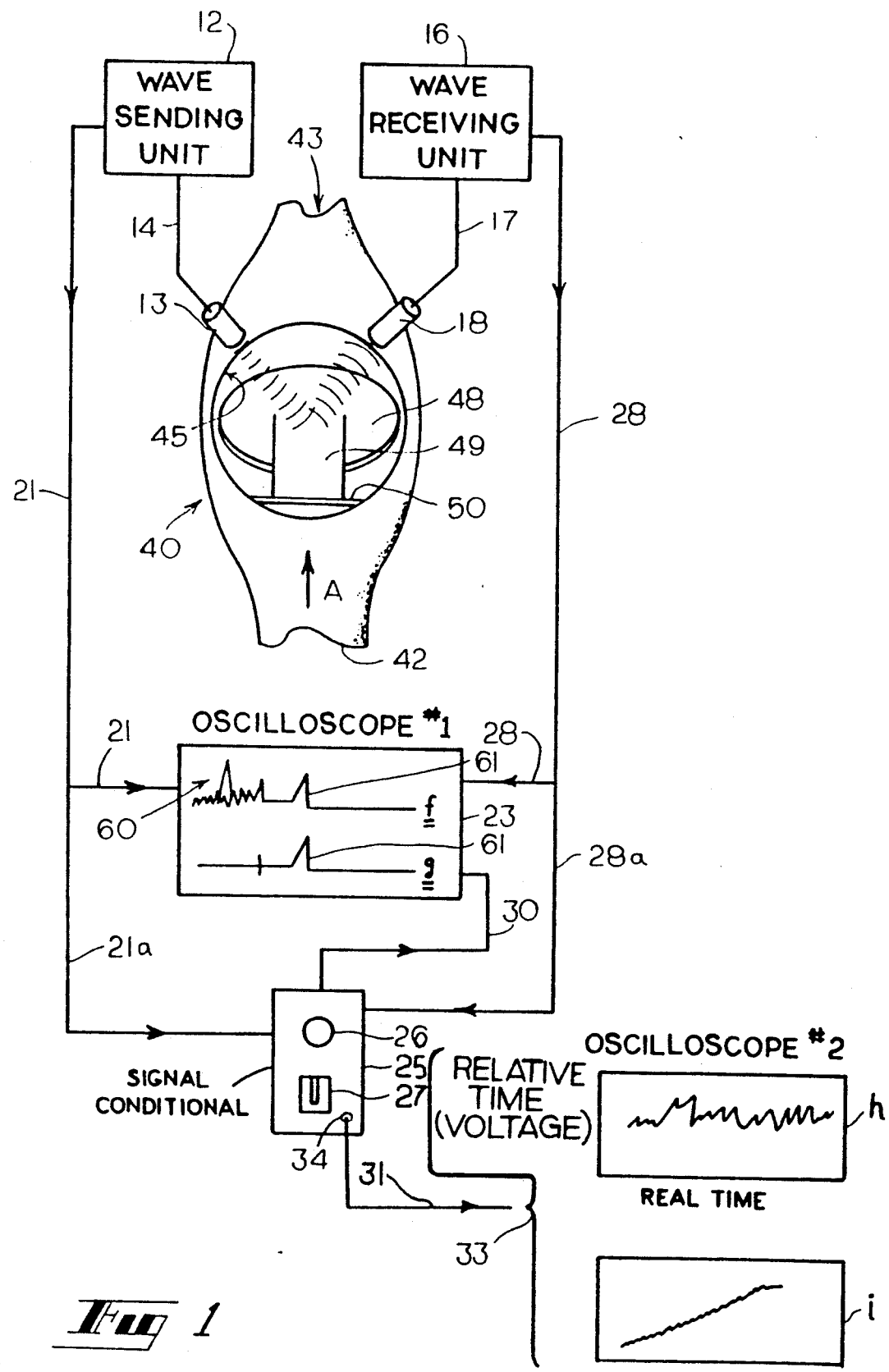
FIG. 1 is a schematic representation of the check valve testing system, in accordance with the present invention.

Referring now in greater detail to the drawings, in which like numerals represent like components throughout the several views, the check valve testing system 10 of the present invention is seen in FIG. 1 as comprising an ultrasonic wave sending unit 12 connected to a wave sending transducer 13 by wire 14; and an ultrasonic wave receiving unit 16 connected by wire 17 to a wave receiving transducer 18. The sending unit 12 is connected by signal cable 21 to a first recording device 23, such as an oscilloscope, and is also connected by the signal cable 21a to a signal conditioning device 25. The wave receiving unit 16 is connected by signal cable 28 to the first recording device 23 and by cable 28a to the signal conditioning device 25.

The signal conditioning device 25 comprises a discriminator 26 and a counter/delay device 27, the functions of which are described below. The signal conditioning device 25 is connected by signal cable 30 to the first recording device and by a signal cable 31 to a second recording device 33, such as a second oscilloscope. The signal cable 31 is connected to an analog output terminal 34 of the signal conditioner 25.

The transducers 13, 18 are seen as acting upon a check valve assembly 40, which assembly is seen in detail in FIG. 2. The check valve assembly 40 comprises a fluid conduit 41 providing for normal free flowing of fluid from an inlet 42, in the direction of arrows A, to an outlet 43. Between the inlet 42 and outlet 43 of the fluid conduit 41 is a valve chamber 45 which houses a swinging disk assembly 46. The swinging disk assembly 46 comprises a valve disk 48 mounted to a hinge arm 49, which hinge arm is pivotally connected at a pin 50 which is mounted to the inner wall 51 of the valve chamber. In some embodiments of the swinging disk assembly 46, the valve disk 48 and hinge arm 49 are forged as one component. In other embodiments, as that shown in FIG. 2, the valve disk 48 is bolted to the hinge arm 49 by a stud nut 53 bolted to a threaded stud 54 protruding upward from the disk 48. The check valve assembly 40 further includes a lower valve stop 56 and a back stop 57.

The check valve testing system 10 of the present invention is set-up, in the field, at the location of the check valve along the fluid conduit system. The wave sending unit 12 is set to generate and deliver a pulsing, ultrasonic signal. That is, a sound wave signal is generated repeatedly at desired, equal intervals. The interval of time between each pulse shall be termed the "pulse interval". The rate at which the pulses occur shall be termed the "pulse rate". The frequency of the ultrasonic wave is set sufficiently high to assure transmission of the sound wave through the different medium of the valve casting, fluids, and any other materials associated with the valve assembly 40. The user places the sending transducer 13 and receiving transducer 18 at the valve assembly body so as to direct the sound waves at the valve disk 48 within the valve chamber 45. The two transducers 13, 18 are placed relative to one another such that the receiving transducer 18 can receive the sound wave from the sending transducer 13 after the waves have been directed into the valve chamber 45. Some examples of alternate transducer 13, 18 placement are shown in FIGS. 3 and 4. Note that the transducer location depicted in FIG. 3 and as positions "a", "b" and "c" of FIG. 4 are oriented such that the receiving transducer 18 is receiving sound waves from the sending transducer 13 after the waves have been reflected off the valve disk 48. The position of the transducers 13, 18 depicted as position "d" of FIG. 4 is such that the receiving transducer 18 receives sound waves from the sending transducer 13 without reflection off of the valve disk 48. The significance of this "d" position is further explained below.

With reference again to FIG. 1, the wave sending unit 12 generates a trigger signal upon the generation of each ultrasonic pulse at the sending transducer 13. This trigger signal is delivered along signal cable 21 to the first recording device 23. At the first recording device, this trigger signal triggers the recording device to begin its recording sequence. For example, in the case of an oscilloscope, the trigger signal triggers the oscilloscope to begin its sweeping function. This same trigger signal is delivered along signal cable 21a to the signal conditioner 25 where it triggers the signal conditioner to the fact that a sound wave has been delivered by the transducer 13 and the conditioner 25 should begin its conditioning functions as discussed below.

As each sound wave is generated and directed by the sound transducer 13 into the valve chamber 45, the wave receiving transducer 18 begins to receive reflected and refracted sound waves from various components of the valve assembly 40. For example, a portion of each wave generated at the sending transducer 13 is reflected or refracted by the metal casting of the valve assembly 40, a portion of the wave is reflected and refracted by the fluid within the valve chamber 45 and a portion of the wave is reflected by the valve disk 48. Various other materials and components within the valve assembly 40 and valve chamber 45 may also reflect and refract portions of each wave generated by the sending transducer 13. Thus, for each wave (each pulse) generated at the sending transducer 13, a plurality of waves are received by the receiving transducer 18. Whether reflected or refracted, the waves received by the receiving transducer 18 shall be referred to in this disclosure as "reflected waves". As each reflected wave is received by the receiving transducer 18, the wave receiving unit 16 acknowledges receipt of the wave and generates a signal which is sent along signal cable 28 to the first recording device 23. The signal is recorded by the recording device 23. In the example of an oscilloscope, each signal corresponding to a received, reflected wave is recorded in the form of a spike. Since the reflected waves are received at the receiving unit 18 at different times, a series of signals, separated in time, are sent by the receiving unit 16 to the oscilloscope 23. Thus, the series of signals appear as a plurality of spikes spaced across the screen of the oscilloscope. The Amplitude of the spikes corresponds to the energy of the respective, reflected wave received at the receiving transducer 18. An example of such a sweep is given by trace "f" of FIG. 1.

The pulse rate of the sending unit 12 is adjusted by the user to assist in receiving a good sweep trace at the oscilloscope 23. That is, the pulse rate is set so that a substantial number of the reflected waves from the first generated sound wave are received at the receiving unit 18 before the second generated wave is sent at the sending transducer 13. Each time a new wave is generated at the sending transducer 13, a trigger signal is sent from the sending unit along signal cable 21 to the oscilloscope triggering the oscilloscope to begin a new sweep. As explained above, during the new sweep, the oscilloscope records input from the receiving unit 16 corresponding to the received, reflected waves relating to the respective generated sound wave pulse. Analysis of each recorded trace during each sweep familiarizes the user with a pattern of spikes which correspond to "noise" 60 corresponding to waves reflected or refracted off of the valve casting, the fluid, or other miscellaneous materials; and also familiarizes the user with a particular target spike 61 corresponding to the wave portion reflected off the valve disk 48. The pulse rate of the sending unit 12 is adjusted to assure clear generation of the target spike 61 during each sweep of the oscilloscope 23.

At the same time that the series of signals is sent by the receiving unit to the oscilloscope 23, the same series of signals are delivered along signal cable 28a to the signal conditioner 25. The signal conditioner 25 performs two main functions: (1) isolating of the target spike 61 during each single sweep of the first recording device 23; and (2) converting the digital signal associated with each sweep of the first recording device 23 to an analog signal which signal is delivered to the second recording device 33 along signal cable 31. The isolating function is accomplished as follows: each time the sending unit 12 generates a pulse, the trigger signal is delivered along cable 21a to the counter/delay device 27 of the signal conditioner 25. This trigger signal resets the counter of the counter/delay device 27 to "zero" to begin counting the relative time since the respective pulse was sent by the sending unit 12. The delay mechanism of the counter/delay device 27 further affects the counter by delaying the counter's beginning time by an increment of time selected by the user. In this way, the user adjusts the delay such that the counter does not begin counting until a substantial portion, if not all, of the reflected waves which resulted in the "noise" 60 have been received by the receiving unit 18. The signal conditioner 25 also comprises a discriminating device 26. The function of the discriminating device 26 is to command the signal conditioner 25 to recognize only signals from the receiving unit 16 which have amplitudes in excess of a selected minimum amplitude. Thus, in practice, the user adjusts the discriminator device 26 such that the signal conditioner 25 discriminates in favor of certain, high amplitude signals. Thus, it can be seen, that by selectively adjusting the delay device 27 and the discriminator device 26, the user is able to effectively isolate the target spike 61 from all of the noise spikes 60. The signal conditioner discriminately seeks signals during each pulse interval which signals are generated after the delay interval and which signals exceed or equal the minimum discriminating amplitude. Such isolated signals are conveyed by signal cable 30 to the first recording device 23 where they are recorded. When an oscilloscope is used, the isolated signal is displayed on the lower trace "g" during each sweep of the oscilloscope.

In performance of its second function, the counter of the counter/delay device 27 begins counting upon expiration of the delay interval, and continues counting until the signal conditioner 25 receives a signal from the receiving unit 16 which signal exceeds or equals the discriminating amplitude (i.e. the target spike). Once the counter has stopped counting, the digital output from this digital counter is input to a digital-to-analog converter within the signal conditioner 25. The output of this D/A converter is delivered through the analog output terminal 34 to the second recording device 33. The D/A converter output is, preferably, in the form of an equivalent voltage such that a low count on the counter results in a low voltage and a high count on the counter results in a high voltage. The counter is reset by the trigger signal from the wave sending unit 12 each time a new wave pulse is generated by the sending transducer. Thus, the counter begins a new count for each new generated wave and a separate analog signal is generated for each pulse interval. It can be seen that the counter is counting a relative time span over which the sound wave of a given pulse travels from the sending transducer 13 to the valve disk 48 and then to the receiving transducer 18 (the "critical distance"). If it took a long time for the wave to travel this critical distance, then the count of the digital counter will be high and the analog output voltage will be high. Conversely, if it took a relatively short time for the wave to travel the critical distance, then the count of the digital counter will be low and the analog output voltage will be low. Since the time it takes for the sound waves to travel the critical distance is directly related to the distance of the valve disk 48 away from the transducers 13, 18, the output voltage relates in a relative manner to the position of the valve disk 48 within the valve chamber 45.

The analog output voltage is sent along cable 31 to the second recording device 33 where the voltages corresponding to each of the pulse intervals of the sending unit 12 are collected and recorded. Preferably, the second recording device 33 performs one or more of the functions of collecting, storing, correlating, recording and analyzing of the signal conditioner output. In the preferred embodiment, the second recording device 33 is a storage oscilloscope in which the voltages corresponding to the successive pulse intervals of the sending unit 12 are converted to a digital number and stored.

The storage oscilloscope 33 also functions to successively plot the collected data with respect to time; and to generate and display a time (distance) versus real time curve. This time related correlation of the collected data can be used to diagnose the condition and functioning of the check valve. By way of example, and with reference to FIG. 1, two representative traces are depicted as output of the second recording device 33. In each trace, the vertical axis represents the "relative time" which is a factor which relates directly to the distance of the valve disk 48 from the transducers 13, 18 (voltage). This parameter is termed "relative time" because that time relates separately to each pulse interval of the sending unit and, more specifically to the relative time during which the counter was counting within each pulse interval of the sending unit 12. The horizontal axis of each trace depicts real time. This parameter is called "real time" because it is not reset with each pulse interval of the sending unit 12, but is continuous time spanning the accumulation of a plurality of pulse intervals.

In another embodiment of the present invention, the recording device is a computer or a combination of oscilloscope and computer in which the computer performs various operations on the analog output of the signal conditioner 25. The computer performs spectrum (frequency) analysis of the voltage/time traces. Furthermore, the computer, using known mathematical formulas and additional input such as the known velocities of sound through the various materials, calculates the position of the valve disk 48 within the valve chamber 45 at any given point in "real time". In still another embodiment, the second recording device 33 is an instrumentation analog tape recorder which collects, records and stores the analog signals. The stored data from this tape recorder are subsequently conveyed to an oscilloscope for display and analysis or to a computer for detailed analysis.

An example of analysis of the traces "h", "i" generated by the second oscilloscope 33, is given here. Trace "h" is a representative trace depicting position, and movement of position of the valve disk 48 under fluid flow conditions. It can be seen that, over a period of real time, the voltage, which relates to relative time and to distance of the disk 48 from the transducers 13, 18, fluctuates from higher to lower voltages. This indicates that, at each pulse of the sound wave, the valve disk 48 was at a different distance from the transducer 13, 18. Thus, the trace "h" is indicative of a vibrating or "bouncing" valve disk 48. This condition is indicative of a poorly sized valve, or some other detrimental condition which will result, in the long term, in failure of the valves. Trace "i" shows a gradual increase in voltage depicting movement of the valve disk 48 from an open position (low voltage=short relative time=short distance to transducer), gradually closing to a closed position (high voltage=long relative time=far distance from the transducers). Analysis of such a trace as trace "i" assists in determining: if the valve disk 48 moves freely or binds at some point in the swing; if the valve moves fully from the open to closed position; and if the disk is stable during normal and various fluid flow conditions. Analysis of the output of the first recording device 23 aids in immediate determination of: whether or not the valve disk 48 is actually in place (i.e. broken off or still in place); the relative position of the valve disk 48; and the ability of the swinging disk assembly 46 to fully swing from its open to its closed position.

A user, using the system of the present invention, can test the valve condition under various flow conditions. For example, a first test of the check valve assembly 40 is conducted with full fluid flow through the conduit 41. Analysis of the recordings taken during this first test is used to determine if the valve is (or seems to be) open and if the valve disk is subjected to vibrating or bouncing during the full flow condition. Next, the test is run with the fluid flow set at various flow rates less than the full flow rate. As a result of this second set of tests, the user can record and analyze the position of the valve disk 48 during various flow rates and can record and analyze the effect of lesser flow rate on the vibrating or bouncing of the valve disk 48. Finally, the use can stop fluid flow through the respective fluid conduit 41 and, during this test, locate the positon of the valve disk 48 and record and analyze the swing characteristics of the swinging disk assembly 46 (i.e. Does it bind?).

In an alternate embodiment of the present invention, the transducers 12, 13 are positioned at the locations indicated as "d" in FIG. 4. With the transducers 13, 18 in this location the user seeks to identify whether or not the valve disk 48 has achieved its fully closed position. Thus, if the valve disk 48 is not fully closed, the sound wave generated at sending transducer 13d will be received (in large portions) at the receiving transducer 18d. However, if the valvd disk 48 is fuly seated, the valve disk 48 will interfere with the sound wave generated at the sending transducer 13d; and none of the wave, or only a small portion of the wave will be received at the receiving transducer 18d.

Whereas this invention has been described in detail with particular reference to preferred embodiments thereof, it will be understood that variations and modifications can be effected within the spirit and scope of the invention, as described hereinbefore and as defined in the appended claims.

We claim:

1. Method of testing the operating condition of a fluid flow check valve including a movable disk assembly positioned in a valve chamber, said method comprising the steps of:
   locating a sound wave sending and a sound wave receiving unit at the check valve;
   directing sound wave at the movable disk assembly;
   receiving reflected sound wave reflected off the movable disk assembly;
   observing the time lapse between directing of the sound wave and receipt of the reflected sound wave;
   determining the position of the movable disk assembly within the valve chamber in response to the observed time lapse;
   whereby the position of the movable disk assembly is determined.

2. Method of claim 1, wherein the step of observing the time comprises the steps of:
   generating a first signal upon directing of the sound wave;
   conveying the first signal to a recording device;
   beginning relative time in the recording device upon passage of a predetermined time increment after receipt of the first signal;
   generating a second signal upon receiving the reflected sound wave;
   conveying the second signal to the recording device;
   ending relative time in the recording device upon receipt of the second signal;
   recording the time lapse from beginning to ending of the relative time.

3. Method of claim 1, wherein the step of locating a sound wave sending unit and a sound wave recording unit at the check valve comprises the step of locating a sending unit and a recording unit at the same location at the check valve.

4. Method of testing the operating condition of a fluid flow check valve including a movable valve disk positioned in a valve chamber, said method comprising the steps of:
   directing a first sound wave at the valve disk;
   receiving reflected sound wave resulting from reflection of the first sound wave off the valve disk;
   recording the time lapse between directing and receiving the first sound wave;
   directing a second sound wave at the valve disk;
   receiving reflected sound wave resulting from reflection of the second sound wave off the valve disk;
   recording the time lapse between directing and receiving second sound wave;
   comparing the time lapse of directing and receiving the first sound wave to the time lapse of directing and receiving the second sound wave,
   whereby a relative change in position of the valve disk between the time of directing the first sound wave and directing the second sound wave is determinable.

5. Method of claim 4, further comprisng the steps of sequentially repeating the above steps to generate a comparison resulting from a plurality of directed sound waves over a period of time.

6. Method of testing the operating condition of a fluid flow check valve including a movable valve disk positioned in a valve chamber, said method comprising the steps of:
   directing a sound wave into the valve chamber;
   receiving a plurality of reflected sound waves from reflection of that directed sound wave off elements of the valve;
   generating an isolated signal in response to the receipt of the plurality of reflected sound waves which isolated signal corresponds to the reflected sound wave reflected off the valve disk;
   determining the lapsed time between a selected beginning point of relative time and generation of the isolated signal;
   repeating the above steps at selected intervals over a period of real time; and
   generating a time related correlation between the lapsed times determined during the repetition of steps with respect to real time,
   whereby the lapsed times correspond to a relative position of the valve disk in the valve chamber and thus movement of the valve can be determined and analyzed.

7. Method of claim 6, wherein the step of generating an isolated signal comprises the steps of:
   selectively beginning relative time at a selected time increment after receipt of the first of the pluralify of reflected sound waves to avoid generation of signals from reflected sound waves occurring prior to passage of the selected time increment; and
   discriminately suppressing generation of signals from reflected sound waves having an energy level below a predetermined minimum level; and
   wherein the step of determining the lapsed time between a selected beginning point of relative time and generation of the isolated signal, comprises the step of determining the lapsed time between the beginning of th relative time and genration of the isolated signal.

8. Method of claim 6, further comprising the step of analyzing the lapsed time versus real time trace.

9. Method of monitoring a fluid flow check valve, said check valve including a movable check valve disk positioned in a check valve chamber defined by a check valve casting, said method comprising the steps of:
 directing a sound wave through the check valve casting toward the check valve disk;
 receiving a reflected sound wave reflected off the check valve disk and through the check valve casting; and
 generating a signal which corresponds to a relative position of the check valve disk.

10. Method of claim 9, wherein the step of generating a signal comprises the step of generating a signal which corresponds to the lapsed time from the end of a selected delay, subsequent to the directing of the sound wave, until the receipt of the reflected sound wave.

11. Method of claim 10, further comprising the step of repeating the above directing, receiving, and generating steps at selected intervals over a period of time to monitor relative movement of the check valve disk.

12. Method of claim 11, further comprising the step of removably and temporarily locating a sound wave sending unit and a sound wave receiving unit at the check valve.

13. Method of claim 11, further comprising the steps of:
 receiving a plurality of reflected sound waves reflected off elements of the check valve; and
 discriminating against reflected sound waves which have energy levels below a predetermined level.

14. Method of claim 11, further comprising the step of plotting a generated signal versus real time curve which reveals changes in position of the check valve disk with respect to real time.

15. Method of claim 11, further comprising the step of forcing fluid through the check valve during the above mentioned steps.

16. Method of claim 10, further comprising the step of removably and temporarily locating a sound wave sending unit and a sound wave receiving unit at the check valve.

17. Method of claim 10, further comprising the steps of:
 receiving a plurality of reflected sound waves reflected off elements of the check valve; and
 discriminating against reflected sound waves which have energy levels below a predetermined level.

18. Method of claim 10, further comprising the step of plotting a generated signal versus real time curve which reveals changes in position of the check valve disk with respect to real time.

19. Method of claim 10, further comprising the step of forcing fluid through the check valve during the above mentioned steps.

20. Method of claim 9, further comprising the steps of repeating the above directing, receiving, and generating steps at selected intervals over a period of time to monitor relative movement of the check valve disk.

21. Method of claim 20, further comprising the step of removably and temporarily locating a sound wave sending unit and a sound wave receiving unit at the check valve.

22. Method of claim 20, further comprising the steps of:
 receiving a plurality of reflected sound waves reflected off elements of the check valve; and
 discriminating against reflected sound waves which have energy levels below a predetermined level.

23. Method of claim 20, further comprising the step of plotting a generated signal versus real time curve which reveals changes in position of the check valve disk with respect to real time.

24. Method of claim 20, further comprising the step of forcing fluid through the check valve during the above mentioned steps.

25. Method of claim 9, further comprising the step of removably and temporarily locating a sound wave sending unit and a sound wave receiving unit at the check valve.

26. Method of claim 9, further comprising the steps of:
 receiving a plurality of reflected sound waves reflected off elements of the check valve; and
 discriminating against reflected sound waves which have energy levels below a predetermined level.

27. Method of claim 9, further comprising the step of plotting a generated signal versus real time curve which reveals changes in position of the check valve disk with respect to real time.

28. Method of claim 9, further comprising the step of forcing fluid through the check valve during the above mentioned steps.

29. Check valve monitoring apparatus for monitoring the operating condition of a check valve, said check valve including a movable check valve disk positioned at least partially inside a check valve chamber defined by a check valve casting, said monitoring apparatus comprising:
 wave directing means externally connectable to the check valve casting for directing a sound wave pulse through the check valve casting toward the check valve disk;
 wave receiving means externally connectable to the check valve casting for receiving a reflected sound wave pulse reflected off the check valve disk and through the check valve casting;
 signal conditioning means connected to said wave directing means and said wave receiving means for generating a signal which corresponds to a relative position of the check valve disk.

30. Check valve monitoring apparatus of claim 29, wherein said signal conditioning means comprises means for generating a signal which corresponds to the lapsed time from the end of a selected delay, subsequent to the directing of the sound wave pulse, until the receipt of the reflected sound wave pulse.

31. Check valve monitoring apparatus of claim 30, further comprising a recording means connected to said signal conditioning means for collecting the generated signals and for graphically relating the generated signals to real time.

32. Check valve monitoring apparatus of claim 30, wherein said signal conditioning means comprises:
 delay means for creating a time delay after a sound wave pulse is directed;
 counter means for counting lapsed time from the end of the time delay; and
 discriminating means for isolating received sound wave pulses above a minimum selected energy level.

33. Check valve monitoring apparatus of claim 29, further comprising a recording means connected to said signal conditioning means for collecting the generated signals and for graphically relating the generated signals to real time.

34. In combination:
a check valve including, at least, a check valve casting, said check valve casting defining a check valve chamber; and a movable check valve disk positioned at least partially inside said check valve chamber:
wave directing means externally connected to the check valve casting for directing a sound wave pulse through the check valve casting toward the check valve disk;
wave receiving means externally connected to the check valve casting for receiving a reflected sound wave pulse reflected off the check valve disk and through the check valve casting;
signal conditioning means connected to said wave directing means and said wave receiving means for generating a signal which corresponds to a relative position of the check valve disk.

35. Combination of claim 34, wherein said signal conditioning means comprises means for generating a signal which corresponds to the lapsed time from the end of a selected delay, subsequent to the directing of the sound wave pulse, until the receipt of the reflected sound wave pulse.

36. Combination of claim 35, wherein said signal conditioning means comprises:
delay means for creating a time delay after a sound wave pulse is directed;
counter means for counting lapsed time from the end of the time delay; and
discriminating means for isolating received sound wave pulses above a minimum selected energy level.

37. Combination of claim 34, further comprising a recording means connected to said signal conditioning means for collecting the generated signals and for graphically relating the generated signals to real time.

38. Method of testing the operating condition of a fluid flow check valve comprising a movable disk assembly positioned in a valve chamber defined by a valve casting, said method comprising the steps of:
directing a sound wave at and through the valve casting into the valve chamber;
positioning a sound wave receiving unit for receipt of the directed sound wave;
recording receipt of the sound wave; and
determining position of the movable disk assembly within the valve chamber in response to the receipt of or failure to receive the sound wave.

* * * * *